Nov. 15, 1966 R. A. MOORE 3,285,581
LIVESTOCK FEED MIXER
Filed Dec. 3, 1964 2 Sheets-Sheet 2

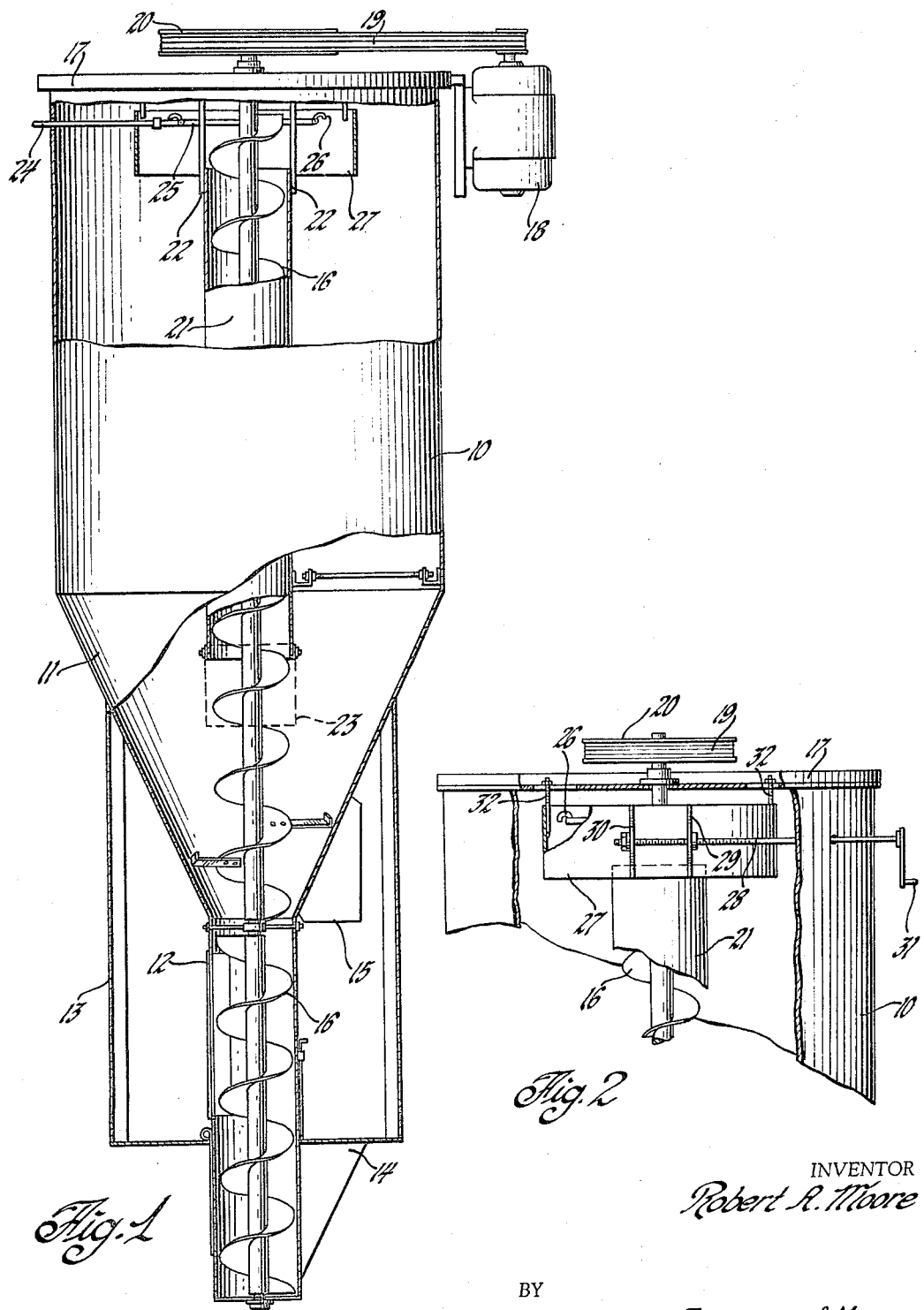

INVENTOR
Robert A. Moore

BY

TOWNSHEND & MESEROLE
ATTORNEYS

United States Patent Office 3,285,581
Patented Nov. 15, 1966

3,285,581
LIVESTOCK FEED MIXER
Robert A. Moore, 203 Lewis Ave., Salem, Va.
Filed Dec. 3, 1964, Ser. No. 415,620
9 Claims. (Cl. 259—23)

This invention relates to mixing apparatus for livestock feed, and in particular to vertical feed mixers in which molasses is added to the feed materials while they are being mixed.

Vertical feed mixers with molasses supply are conventional in the art. Feed material mixing generally is effected by means of a bottom fed auger conveyor operating through a vertical tube disposed axially in the center of the mixer casing, whereby the materials to be mixed are carried upwardly therein and discharged radially from the top of the conveyor tube into the upper end of the casing to fall to its bottom for recirculation by the conveyor. Molasses is flowed or sprayed into the upper end of the casing upon the feed material issuing from the top of the conveyor tube so that it permeates the mass of feed material. Distribution of molasses in the feed mix is not uniform. The viscous liquid tends to localize in pools on top of the mix, which causes objectionable gumming that impairs and retards circulation of the materials and necessitates frequent shutdowns for obstruction clearing.

The present invention avoids the prior art difficulties by the employment of means which effects uniform distribution of molasses throughout the mass of feed materials being mixed and which prevents undue localization and pooling of the molasses.

The invention provides mixing apparatus in which molasses is added to the mass of feed materials in a vertical mixer by co-current entrainment in a confined stream of the mixed feed materials moving downwardly in the upper end portion of the mixer casing.

Other and incidental objects will be apparent from the following description in conjunction with the accompanying drawings, in which:

FIG. 1 is substantially a vertical sectional view through a vertical mixer equipped with the present invention.

FIG. 2 is a fragmentary elevation, partly broken away, of the upper end portion of the mixer.

Figure 3:
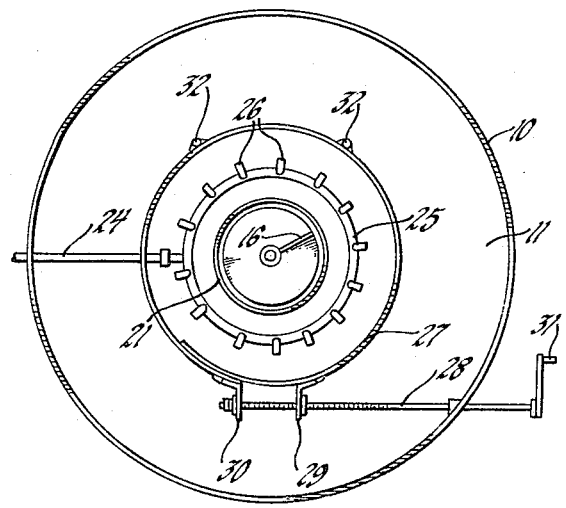
FIG. 3 is a top plan view of the mixer with the top end closure plate removed, illustrating details of the molasses supply and confining baffle means.

In general, the mixer of the present invention is of conventional design, having a vertical casing comprising a cylindrical upper portion 10, an intermediate funnel portion 11 and a diametrically reduced cylindrical lower portion 12, supported on a base 13. A charging hopper 14 supplies the feed materials to be mixed to the lower end of the lower portion 12 of the casing, and the mixed materials are delivered from the bottom of the funnel portion 11 to conventional bagging means 15. An axially disposed auger conveyor 16 extends vertically within the casing with its lower end mounted for rotation in the casing portion 12 and with its upper end journaled in and extending upwardly through a detachable closure plate 17 covering the top of the casing portion 10. The conveyor is operated by a motor 18 supported on the upper exterior of the casing and having a driving belt connection 19 with a pulley 20 fixed on the upper end of the conveyor.

That portion of the auger conveyor 16 which extends between the funnel portion of the casing and its top closure plate is enclosed within a tube 21 of substantially the same diameter as the tubular lower end portion 12 of the casing. The tube is supported from the closure plate by a pair of hanger brackets 22 depending therefrom, with the top end of the tube disposed appreciably well below the closure plate, and exposing the upper end portion of the conveyor 16 which rises to a point closely proximate the cover plate. The lower end of the conveyor tube 21 extends down into the upper part of the casing funnel portion 11 and mounts an axially adjustable extension sleeve 23 that may be positioned as desired to expose more or less of the auger 16 whereby to regulate the volume of feed mix supplied to the conveyor for circulation in the mixer.

It will be understood that when the mixer is in operation feed materials fed from the hopper 14 to the lower end of the auger conveyor will be carried upward thereby into the funnel portion 11 and through tube 21 to spill radially outward from the top end of the tube and fall down through the casing onto the inclined face of the funnel portion which guides the material against the exposed area of the conveyor for elevation up through the tube 21 and consequent recirculation in the mixer in the conventional manner of vertical mixers.

Figure 4:
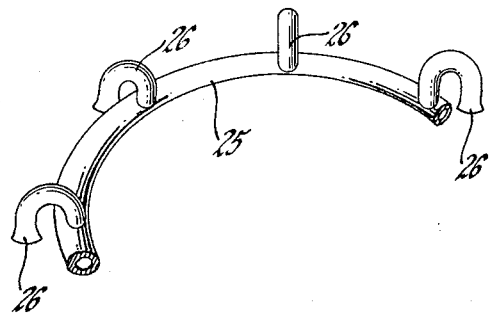
FIG. 4 is a fragmentary perspective view of the molasses supply manifold and dispensing nozzle structure employed.

The feed materials being mixed are carried by the auger 16 somewhat above the top end of the conveyor tube 21 over which they are discharged radially into the upper end portion of the mixer casing. At this point molasses is added to the feed mix through a supply pipe 24 which extends through the casing wall and supports on its inner end a ring manifold 25 with which it connects. The manifold is disposed horizontally above the top of the conveyor tube in concentric radially spaced relation thereto approximately one-third of the radial distance between the axis of the tube and the casing wall, and is provided with a series of dispensing nozzles in the form of inverted U-shaped bendable pipes 26 directed radially outward from the manifold ring. As best shown in FIG. 4, the tips of the nozzles may optionally be crimped to diffuse the discharging molasses in a spray film.

It has been found in practice that in order to obtain the maximum efficiency in distribution of molasses it is necessary that it be entrained in a stream of the feed mix that is confined over the initial period during which the mix begins to fall from the upper end portion of the mixer casing after issuing from the top of the conveyor tube 21. This entrainment is affected in the present invention by means of a substantially circular baffle that is concentric to the manifold ring radially outward thereof about midway between the axis of the conveyor and the wall of the mixer casing. The baffle is of a height such that it extends axially in the casing from a point slightly below the top of the conveyor tube 21 to a point appreciably above the molasses manifold and nozzle assembly but spaced vertically below the top closure 17 of the casing. The baffle is adapted for circumferential constriction and expansion by adjustment means later described.

In the FIG. 1–3 embodiment the baffle is a split circular band 27 with overlapped ends and which is sufficiently flexible to permit circumferential constriction and expansion by operation of a rotatable shaft 28 having threaded engagement with lateral lugs 29 and 30, respectively on the overlapped end portions of the band. Shaft 28 is journaled through the casing wall and extends outwardly therefrom for operation by a handle 31 attached thereto. In addition to the support provided by the shaft 28 the split ring band 27 is further supported by hanger brackets 32 depending from the casing top closure plate.

The alternative form of confining baffle shown in

Figure 5:
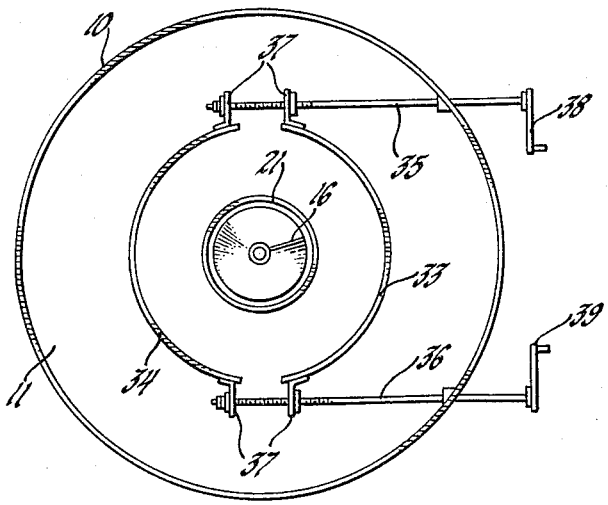
FIG. 5 is a top plan view similar to FIG. 3 but illustrating an alternative form of confining baffle.

FIG. 5 consists of separate and substantially semicircular bands 33 and 34 similar to the previously described baffle 27 in height and in location. Constriction and expansion of the baffle is procured by moving the bands towards and away from each other by operation of rotatable shafts 35 and 36 having threaded engagement with lateral end lugs 37 on the respective bands. The shafts are journaled through the casing wall and extend outwardly therefrom for operation by their respective handles 38 and 39.

The types of feed commonly treated in the vertical mixer of this invention are characterized as either "light" or "heavy." Light feed is bulky, with a high concentration of hay and roughage such as chopped corn fodder, ear corn with husk, and unthreshed baled oats. Heavy feed has a high concentration of ground shelled corn, ear corn on cob, wheat and barley. In operation, light feed mix issuing from the top of the conveyor tube has a tendency to clog and bridge the area between the top of the conveyor tube and the baffle if the baffle diameter is not large enough to allow free passage of the material. The proper diameter is variable, depending on the nature of the feed components being mixed, the volume of material issuing from the conveyor tube, and ambient atmosphere and temperature conditions. Such bridging is objectionable and necessitates frequent shutdown of the mixer for clearing.

The adjustable baffle of the present invention eliminates material bridging. If it becomes noticeable or is anticipated the diameter of the baffle can be enlarged as required by operation of the previously described adjustment means and without shutdown of the mixer. Furthermore, by appropriate constriction or expansion of the baffle its diameter may be reduced or enlarged as desired to vary the width of the passage between the conveyor tube and the baffle to regulate the volume of feed mix being passed and the rate of its recirculation in the mixer.

An important feature of the invention is the function of the baffle in preventing radial discharge of the molasses outwardly onto the casing wall; which is wasteful and objectionable in that it collects on the wall in quantity and drains as a pool around the outer top edge of the mass of material in the funnel portion of the casing instead of diffusing evenly through the mix. Additionally, due to the fact that the nozzles 26 discharge downwardly and are enshrouded inside the baffle the streams of molasses are co-current with the down moving stream of the feed material and are entrained therein within the area defined by the baffle.

Another important function of the baffle is confinement of the feed mix and molasses in a down flowing stream which, because of the relative axial overlap between the bottom marginal portion of the baffle and the top end portion of the conveyor tube, is slightly compressed radially as it falls away from the bottom edge of the baffle. This confinement and compression, though slight, is sufficient to inhibit and retard radial dispersion of the steam until it has fallen well below the baffle, so that the mix does not pyramid into the upper end portion of the mixing casing, as it would do in the absence of the baffle.

It is to be understood that the herein disclosed embodiment of my invention is illustrative of a practical example and that the invention is not restricted thereto. It may comprise any structure falling within the scope of the invention as claimed.

I claim:

1. In an apparatus for mixing livestock feeds and molasses which includes a vertical casing having a cylindrical upper portion, a top closure thereon, a vertical conveyor tube extending centrally within said casing portion and terminating at its upper end in spaced relation below the top closure, conveyor means in the tube operative to elevate feed materials therethrough to discharge radially from and over the top end of the tube, and a molasses supply pipe extending into the casing: a ring manifold on said pipe in the space between the top of the conveyor tube and the top of the casing concentric with and spaced radially outward relative to the conveyor tube, a circumferential series of molasses discharge nozzles on said manifold, and a substantially circular baffle enveloping and surrounding said manifold concentric therewith and spaced radially outward therefrom.

2. In the apparatus of claim 1, the baffle being a band spaced at its top edge below the top of the mixer casing.

3. In the apparatus of claim 2, the bottom edge of the baffle band being below the top end of the conveyor tube.

4. In the apparatus of claim 1, means operative from the exterior of the casing to expand and constrict the baffle.

5. In the apparatus of claim 1, said baffle being capable of radial expansion and contraction to vary the area circumscribed thereby.

6. In the apparatus of claim 1, said baffle comprising a split band with overlapped ends, and actuator means extending into the casing in operative connection with said ends for increasing and decreasing the extent of their overlap whereby to expand and constrict the band.

7. In the apparatus of claim 1, said baffle comprising separate substantially semicircular portions, and actuator means extending into the casing in operative connection with said portions for moving them together and apart to vary the area circumscribed thereby.

8. In an apparatus for mixing livestock feeds and molasses which includes a vertical casing having a cylindrical upper portion, a top closure thereon, a vertical conveyor tube extending centrally within said casing portion and terminating at its upper end in spaced relation below the top closure, conveyor means in the tube operative to elevate feed materials therethrough to discharge radially from and over the top end of the tube, and a molasses supply pipe extending into the casing: baffle means in the upper end portion of the casing surrounding the top of the conveyor tube between the tube and the casing wall, whereby to confine and direct feed materials discharged from the top of the tube so that they fall as a stream shaped by the confining action of the baffle means, said molasses supply pipe having a manifold positioned for discharging into the confined feed materials stream intermediate the baffle means and the top of the conveyor tube.

9. In the appartus of claim 8, said manifold having a plurality of discharge nozzles arranged in the path of travel of the feed materials stream co-currently thereto.

References Cited by the Examiner

UNITED STATES PATENTS 2,192,806  3/1940  Smith _____ 259—23
3,143,336  8/1964  Byberg.

FOREIGN PATENTS 1,313,968  11/1962  France.

WALTER A. SCHEEL, *Primary Examiner.*

J. M. BELL, *Assistant Examiner.*